United States Patent [19]
Kaltner

[11] Patent Number: 5,059,951
[45] Date of Patent: Oct. 22, 1991

[54] METHOD AND APPARATUS FOR INTEGRATED DATA CAPTURE AND ELECTRONIC ARTICLE SURVEILLANCE

[75] Inventor: George W. Kaltner, Mt. Holly, N.J.

[73] Assignee: Checkpoint Systems, Inc., Thorofare, N.J.

[21] Appl. No.: 271,001

[22] Filed: Nov. 14, 1988

[51] Int. Cl.$^5$ .............................................. G08B 13/14
[52] U.S. Cl. .................................. 340/572; 340/551; 235/383; 235/375; 235/487
[58] Field of Search ................. 340/572, 551; 382/12, 382/69; 235/375, 383, 439, 449, 487, 493

[56] References Cited

U.S. PATENT DOCUMENTS

| | | | |
|---|---|---|---|
| 3,938,044 | 2/1976 | Lichtblau | 340/572 |
| 4,141,078 | 2/1979 | Bridges, Jr. et al. | 340/572 |
| 4,498,076 | 2/1985 | Lichtblau | 340/572 |
| 4,567,473 | 1/1986 | Lichtblau | 340/572 |
| 4,728,938 | 3/1988 | Kaltner | 340/572 |
| 4,881,061 | 11/1989 | Chambers | 340/572 |

FOREIGN PATENT DOCUMENTS 8502285 5/1985 Sweden ......................... 340/572

Primary Examiner—Reinhard J. Eisenzopf
Assistant Examiner—Geoff Sutcliffe
Attorney, Agent, or Firm—Weiser & Stapler

[57] ABSTRACT

The access window of a slot scanning data capturing system, or the gun of a hand held data capturing system, is fitted with a deactivation system of the type which is generally used to deactivate the tags or labels of an electronic article surveillance system so that the tag or label which is provided on the goods (to be purchased) is deactivated in the course of capturing the data at the point of sale.

29 Claims, 6 Drawing Sheets

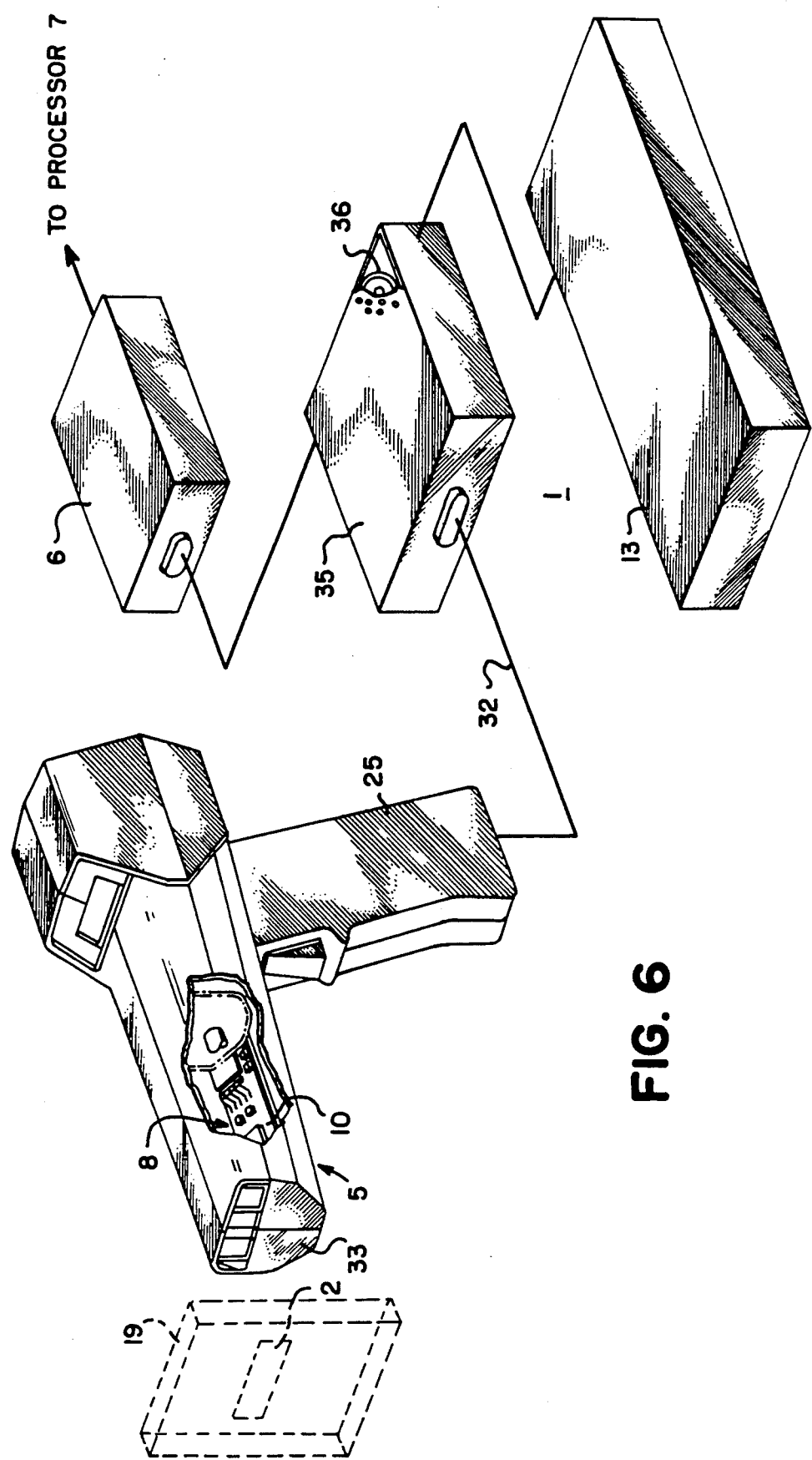

METHOD AND APPARATUS FOR INTEGRATED DATA CAPTURE AND ELECTRONIC ARTICLE SURVEILLANCE

BACKGROUND OF THE INVENTION

The present invention relates generally to the field of electronic article surveillance, and in particular, to a means for deactivating an electronic article surveillance system which is compatible and indeed combinable with existing point-of-sale data capturing systems.

An inevitable part of modern retailing is the problem of so-called inventory shrinkage. This problem leads to significant costs, which are in turn passed on to the consumer, creating both significant problems for the retail establishment and material cost increases to the public in general. For this reason, there have been significant efforts to develop electronic article surveillance devices which are capable of dealing with this problem of inventory shrinkage.

Generally speaking, this is accomplished by applying a special tag or label to the articles which are stocked by a retail establishment, and by providing electronic equipment which is capable of detecting when such tags or labels pass in its vicinity. A variety of different types of tags or labels have been developed for this purpose, including rigid (so-called "hard") tags which are generally applied to the goods by special fasteners, as well as flexible tags (e.g., labels or hang-tags) which can be applied to the goods using more conventional means.

Irrespective of its form, the tag or label which is used is generally provided with an internally disposed stimulus which is capable of exciting the associated apparatus. This often takes the form of a circuit which is capable of reacting with a specified field to cause a detectable event which can then provide a warning signal. This general approach has been used in connection with magnetic, radio frequency and microwave systems to provide electronic article surveillance in a variety of different retail settings.

In operation, the selected tag or label is applied to the goods in appropriate fashion. Once applied to the goods, an unauthorized attempt to remove such articles from the retail establishment will cause the electronic article surveillance equipment (which is traditionally stationed near the point of exit from the retail establishment) to detect the presence of the tag or label, and the goods with which it is associated, providing an alarm which is capable of alerting the retail establishment of the attempted removal.

However, it is unavoidable that a similar signal will also be produced each time a customer properly removes purchased goods from that same retail establishment, or enters another retail establishment with similar equipment. For this reason, it becomes desirable to take appropriate steps to "defeat" those tags or labels which are applied to goods which have been purchased by customers of the retail establishment. A variety of different techniques had been developed to accomplish this task, often relating to the type of tag or label which was used.

For example, hard tags are customarily defeated by physically removing them from the goods, once purchased. This generally necessitates the use of a special device for removing the pins which hold the hard tags to the goods. Hang-tags can simply be cut or torn from the goods, once purchased. Labels applied to the goods can be defeated by covering them (and the circuit which they contain) with a so-called "Thank You" tag which incorporates a foil (e.g., of aluminum) capable of inhibiting interaction between the label and the electronic article surveillance equipment of the retail establishment.

Each of these techniques permits a customer to remove purchased goods from a given retail establishment. However, each of these techniques was found to exhibit its own particular disadvantages. For example, the hard tags tended to leave unacceptable marks in the goods, resulting from the attaching pins. Cutting or tearing the hang-tags from the goods often resulted in a loss of traditionally provided information (size, description, price, etc.) pertaining to the goods which the consumer would later require. The "Thank You" tags would at times fall off, leading to a compromised result, and also tended to alert the public to the use of the security device, inviting attempts to abrogate the security measures which had been taken. In any event, these systems generally required additional and separate operations, leading to a slowing of the check-out process and a potential for human error (in forgetting to defeat the tag or label).

Recognizing this, steps were taken to develop more convenient tag/label defeating systems which would effectively assure proper deactivation of the security device following a legitimate purchase, without compromising the effectiveness of the overall system. One such system is the Counterpoint ® deactivation system which is manufactured by Checkpoint Systems Inc. of Thorofare, N.J. This deactivation system makes use of specially configured tags or labels in connection with an apparatus for positively deactivating such tags or labels in an efficient and secure manner. To this end, a tag (or label) of the type described in U.S. Pat. No. 4,498,076 (George J. Lichtblau) is provided with a resonant circuit having a capacitor portion that is provided with an indentation which permits the resonant circuit to be deactivated as described in U.S. Pat. No. 4,728,938 (George W. Kaltner), for example. The described tag and deactivation system combine to provide a tag or label which ordinarily operates in the manner previously described, to prevent the unauthorized removal of an article from a retail establishment, but which is readily deactivated at the point of sale by subjecting the tag or label to a relatively high power signal which, because of the mechanical indentation which is provided, is sufficient to cause a short circuit within the tag or label to thereby deactivate it.

However, even this enhanced system continued to require a separate deactivation procedure at the point of sale, to permit the removal of purchased goods from the retail establishment. It became apparent that such deactivation procedures could be significantly enhanced (i.e., simplified and more reliably performed) if they could be made part of the traditional operations which occur in connection with a retail sales transaction. For example, in more traditional settings it was found that such assurances were provided by placing the deactivation apparatus directly upon the check-out counter, adjacent to the cash register, so that the deactivation procedure could be incorporated into the check-out procedure, or even the bagging procedure which would then follow.

Such measures proved to be more difficult in connection with some of the more advanced point-of-sale, data capturing devices which have recently been developed for inventory control purposes and the like. One such device which has found wide acceptance makes use of standardized bar codes applied to the various products, and takes steps to read such bar codes and then cross-reference the acquired information with an appropriate data base for developing pricing or inventory controls. Two of the more popular approaches which have been developed to read bar codes of this type and which have found particular acceptance in the industry are the so-called "slot scanners", and "hand-held" or "gun-type" scanners.

The slot scanners generally make use of an apparatus (e.g., a laser scanner) for reading bar codes which is disposed beneath the check-out counter, adjacent to the point-of-sale equipment, to read bar code information as the article provided with the tag or label is passed over the unit. Such devices are often found in supermarkets and department stores, and an example of such equipment is the Model 750F bar code scanner which is manufactured by Spectra-Physics, Inc. of Eugene, Oreg. The hand-held or gun-type scanners generally make use of a similar procedure (i.e., laser scanning) to read such bar codes, with the primary difference that the scanning device is incorporated into a hand held "gun" which can be directed toward the article provided with the tag or label to read the bar code information which is provided. Such devices are often found in drug stores, convenience stores and the like, and an example of such equipment is the LS-7000 II bar code scanner which is manufactured by Symbol Technologies, Inc. of Bohemia, N.Y.

It therefore became desirable to incorporate a tag/label deactivation system used in electronic article surveillance into such point-of-sale, data-capturing systems, including those of the type generally described above.

SUMMARY OF THE INVENTION

It is therefore the primary object of the present invention to provide means for deactivating an electronic article surveillance system which can be integrated with a point-of-sale, data-capturing system.

It is also an object of the present invention to provide an electronic deactivation system which can be integrated with a variety of different types of point-of-sale, data-capturing systems.

It is also an object of the present invention to provide an electronic deactivation system which can be incorporated into a point-of-sale, data-capturing system without provoking radio frequency interference between the two systems despite their close proximity.

It is also an object of the present invention to provide an electronic deactivation system having such capabilities which is easy to use, and which assures a positive deactivation of the tag or label in the course of the data capturing procedure.

These and other objects are achieved in accordance with the present invention by fitting the access window of a slot scanning data capturing system, or the gun of a hand held data capturing system, with a deactivation system of the type generally used to deactivate the tags or labels of an electronic article surveillance system so that the tag or label which is provided on the goods (to be purchased) is deactivated as part of the data capturing steps which are performed at the point of sale.

In connection with the slot scanning device, the deactivation unit is placed beneath the cover panel for the device so that as articles are drawn across the slot scanning device, the tag or label applied to the goods is simultaneously exposed to the energy field which is used to deactivate the tag or label as previously described. In connection with the hand held device, the deactivation unit is positioned within the forward end of the gun which is used for data capturing purposes so that the tag or label is deactivated as the gun is directed toward the article with the tag or label (to be purchased) in order to read the bar code information on the article. In either case, deactivation of the tag or label is accomplished in the course of reading the bar code on the article which is being purchased, thus deactivating the tag or label without requiring a separate operation to do so.

To be noted is that both the deactivation system and the data capturing system employed in accordance with the present invention each make use of high frequency signals (which are relatively close to one another in frequency) in connection with rather sensitive signal detecting equipment. The data capturing system necessarily employs rather sensitive circuitry for achieving the scanning operation which is to be performed, and the deactivation system necessarily develops certain relatively high energy fields to accomplish its particular task. Considering these factors, it was generally expected by persons of ordinary skill in the art that such a combination of devices would not operate satisfactorily in a practical setting. Rather, it was expected that unacceptable interference would inhibit either one or both of the functions which were to take place. Nevertheless, it was found that the special measures which are taken to assure that the deactivation system satisfies certain FCC requirements, and the special shielding which is provided as part of the data capturing equipment, could be caused to cooperate in a particularly beneficial manner to permit each of the two functions which were to take place to occur in a single environment, without interfering with one another. As a result, it was found that the deactivation of tags or labels could be accomplished together with data capture, permitting the deactivation procedure to be incorporated into the data capturing procedure as originally desired.

For further detail regarding preferred systems produced in accordance with the present invention, reference is made to the description which is provided below, taken in conjunction with the following illustrations.

BRIEF DESCRIPTION OF THE DRAWINGS

FIG. 6 is a schematic illustration of remaining components of the hand held scanning device of FIG. 4.

DETAILED DESCRIPTION OF PREFERRED EMBODIMENTS

Figure 1:
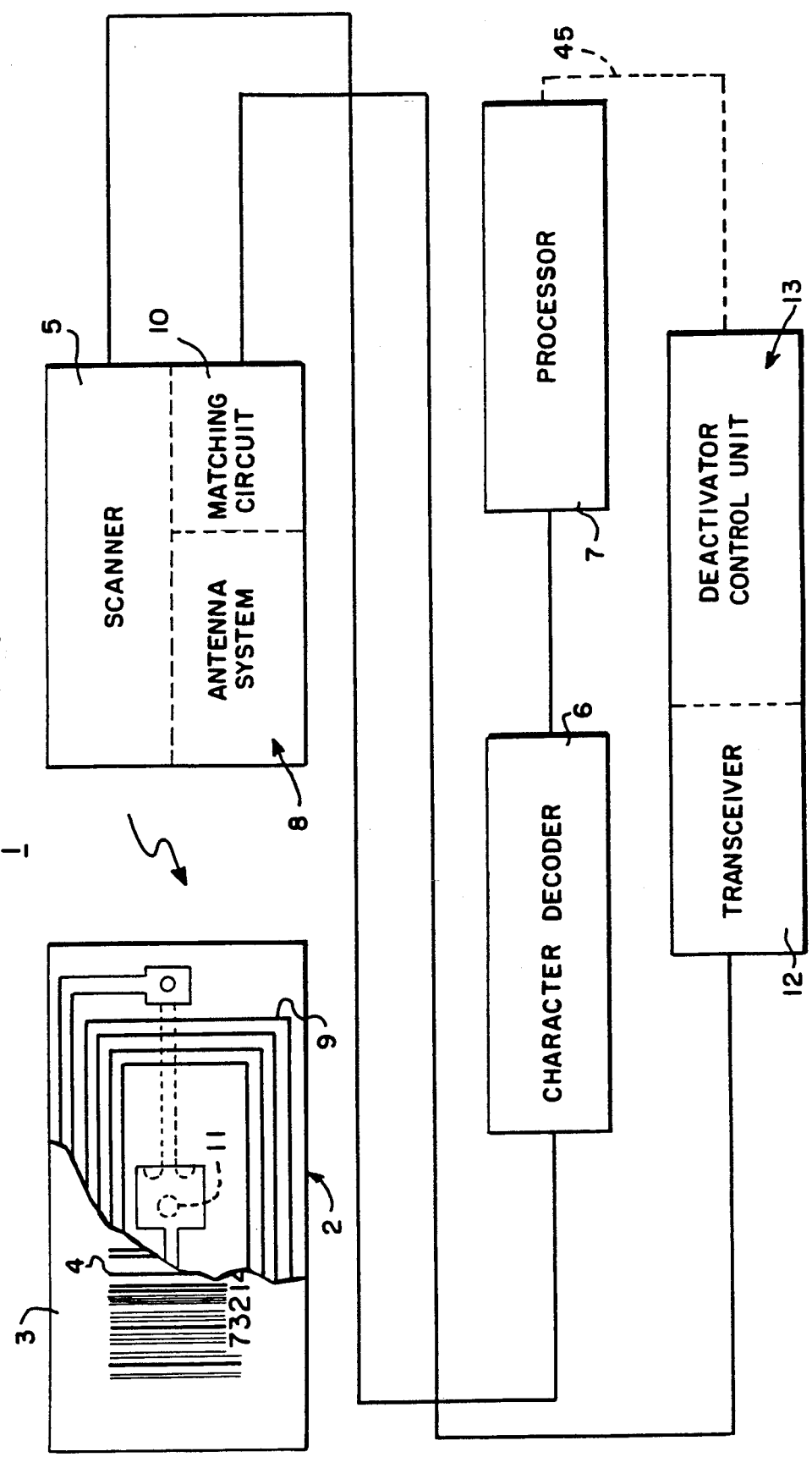
FIG. 1 is a block diagram which generically illustrates the combined, data capturing/deactivation system of the present invention.

FIG. 1 generally illustrates the integrated data-capturing/deactivation system 1 of the present invention. In describing the basic components of this system, it shall be assumed that the system 1 is to operate in conjunction with a label 2 of the type generally described in U.S. Pat. No. 4,498,076, the subject matter of which is incorporated herein by reference, and that the surface 3 of the label 2 has been provided with a desired bar code marking 4 representing an article (not shown) to which the label 2 has been applied. However, it is to be noted that other markings may also be provided on the surface 3 of the label 2 to indicate product, store, or other data, as desired. It is also to be noted that it is not essential for the bar code marking 4 to be provided directly upon the surface 3 of the label 2. However, at present, such separate placements are considered less desirable since this tends to require that the label 3 and the bar code marking 4 be separately addressed during the check-out procedure at the point of sale.

A scanner 5 is provided for addressing the bar code marking 4, to read the data which it contains, making use of generally recognized techniques which are in themselves known. Such data, once acquired, is then in turn processed by a character decoder 6 and a processor 7, in otherwise conventional fashion, to provide desired pricing and/or inventory management controls in connection with a traditional point-of-sale transaction.

In accordance with the present invention, the antenna system 8 of a deactivation system 1 which is capable of deactivating the resonant circuit 9 which forms part of the label 2, as disclosed in U.S. Pat. No. 4,728,938, is integrated with the scanner 5. As will be described more fully below, this is accomplished by fitting (incorporating) the scanner 5 with appropriate transmitting and receiving antennas, and a matching circuit 10, which operate to develop a short circuit in or otherwise disable the resonant circuit 9 at the indentation 11 which is provided in the label 2 for this purpose. To provide the functions which are necessary to accomplish this deactivation, the matching circuit 10 of the antenna system 8 is electrically connected to a transceiver 12 which forms part of the control unit 13 for the deactivation system 1. Further detail regarding the system 1 will now be provided in connection with two alternative embodiment scanner configurations, which have presently found wide acceptance in the industry.

Figure 2:
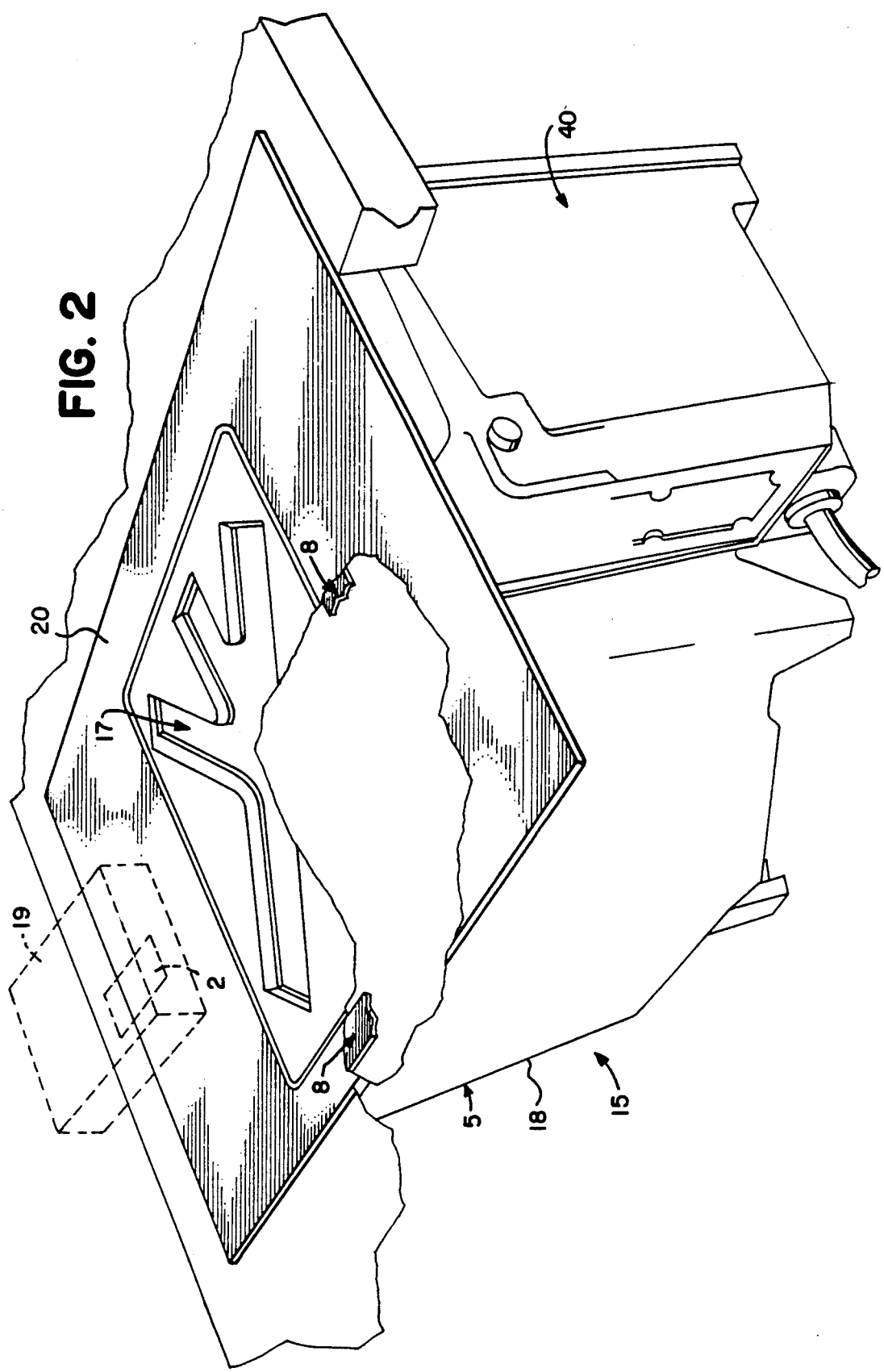
FIG. 2 is a perspective view of a slot scanning device incorporating the deactivation system of the present invention, with portions broken away to show internal construction detail.

FIG. 2 shows a so-called "slot scanner" of the type manufactured by Spectra-Physics, Inc. of Eugene, Oreg. (Model 750F). Except for the improvements of the present invention, the slot scanner 15 is completely conventional in configuration, and is essentially unaffected by the operation of the system 1 of the present invention. In operation, the slot scanner 15 takes steps to direct a beam of light, generated by a laser (not shown), so that the incident beam of light can address a label 2 (affixed to certain goods 19) passing above the window 17 which is provided in the cover 20 of the casing 18. Reflected light is then returned to a receptor (not shown), for appropriate interpretation using known techniques.

Figure 3:
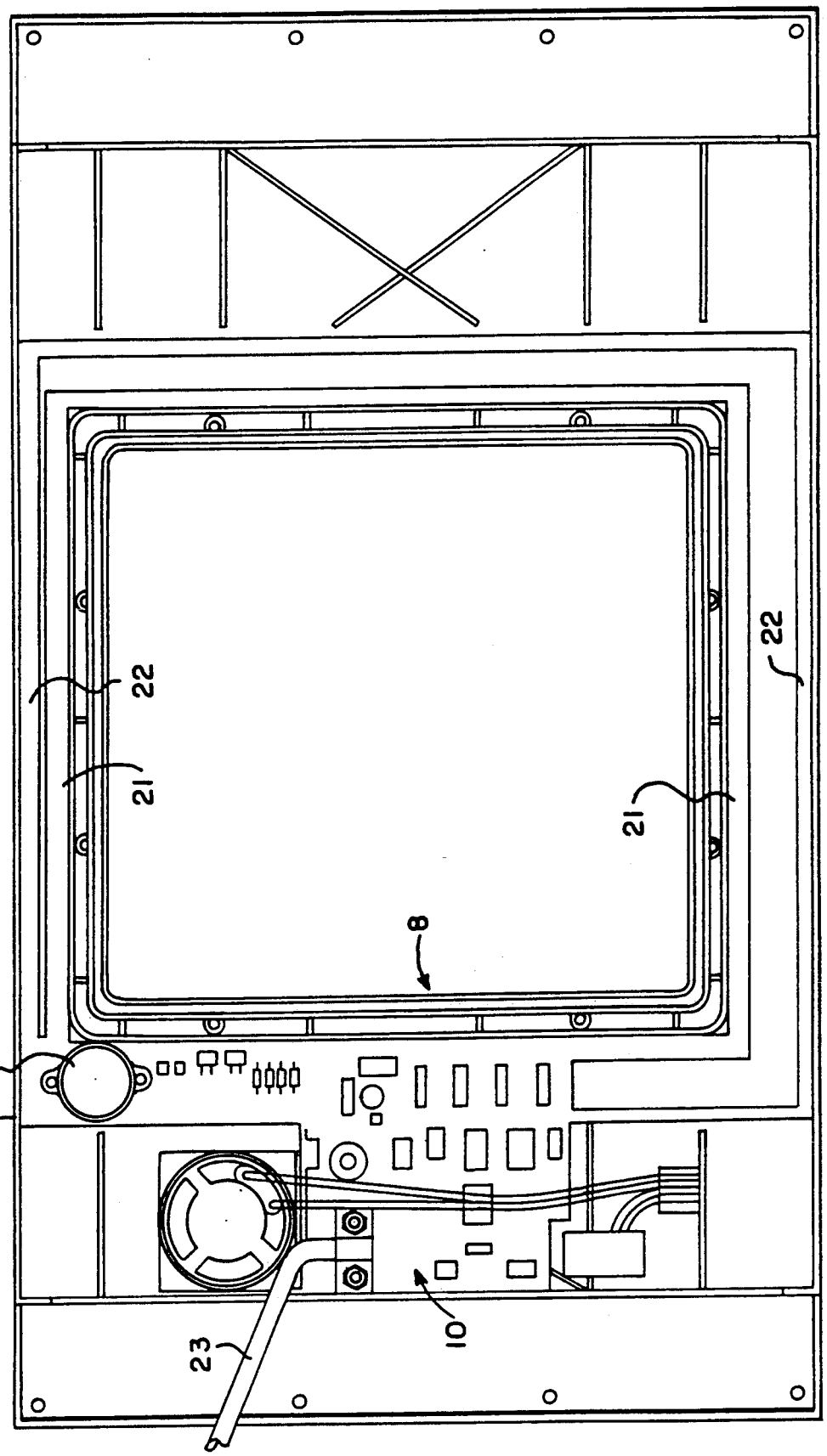
FIG. 3 is a bottom plan view of the cover of the slot scanning device of FIG. 2, also showing portions of the deactivation system.

In accordance with the present invention, the components of the antenna system 8 are positioned below the cover 20 of the slot scanner 15, adjacent to the window 17 as shown. Referring now to FIG. 3 of the drawings, this is accomplished by fitting a pair of single loop antennas 21, 22 to the underside of the cover 20 to circumferentially surround the window 17. The antennas 21, 22 are electrically coupled to the matching circuit 10, which is also fitted to the underside of the cover 20 of the slot scanner 15. The matching circuit 10 includes the circuitry which is necessary to develop and receive appropriate signals, using the antennas 21, 22, to deactivate the label 2 by exposing the resonant circuit 9 which it contains to a relatively high energy field which is sufficient to cause a short circuit in the resonant circuit 9 of the label 2 as previously described.

The control unit 13 (and transceiver 12) serves to provide the signals which are used to regulate operation of the antenna system 8, and accordingly, to regulate deactivation of the label 2. These signals are conveyed by a cable 23 which extends between the transceiver 12 (which as part of the control unit 13 is remotely locatable) and the casing 18 of the slot scanner 15. To be noted is that the antennas 21, 22, the matching circuit 10 and the cable 23 do not interfere (either mechanically or electrically) with the operative features of the slot scanner 15. In fact, the only affected component of the slot scanner 15 is its (easily removable) cover 20, significantly simplifying both fitting and retrofitting of the slot scanner 15 with the deactivation system 1.

The matching circuit 10, transceiver 12 and control unit 13 correspond in structure and operation to those of the earlier mentioned Counterpoint ® deactivation system marketed by Checkpoint Systems Inc. of Thorofare, N.J. Consequently, these units, in combination with the antennas 21, 22, operate to deactivate the resonant circuit 9 of a label 2 in essentially the same fashion as previously, but in this case as part of the data capturing procedure which is to take place, as follows.

In use, an article 19 to be sold, and appropriately fitted with a label 2, is passed across the window 17 of the slot scanner 15 so that the slot scanner 15 can operate to read the bar code marking 4 which is provided on the surface 3 of the label 2. In the course of this scanning procedure, care is taken to draw the product across the window 17 so that the label 2 is brought sufficiently close to the antennas 21, 22 to encounter the electrical field which is produced by the transmitting antenna 21, and to interact with the antennas 21, 22 to provide an appropriate indication of the status of the label 2 as it encounters the operative portions of the deactivation system 1. To permit this, it is only necessary that the operator of the system 1 take care to pass the article 19 which bears the label 2 sufficiently close to the window 17 to encounter these fields. This distance (e.g., 0.5 to 3 inches for deactivation) is fully within the acceptable operating range of the slot scanner 15, so that the data capturing function of the slot scanner 15 is in no way compromised.

To provide appropriate assurance that the label 2 has been deactivated, as desired, the deactivation system 1 provides an audible signal when a label 2 with an operational resonant circuit 9 is encountered. When the resonant circuit 9 of the label 2 is deactivated, resulting from energy received from the transmitting antenna 21, this audible signal will cease, verifying the resulting deactivation procedure. This function, which is also part of the conventional Counterpoint ® deactivation system, is effectuated by a beeper 24 associated with the matching circuit 10 and fitted to the cover 20 of the slot scanner 15.

Figure 4:
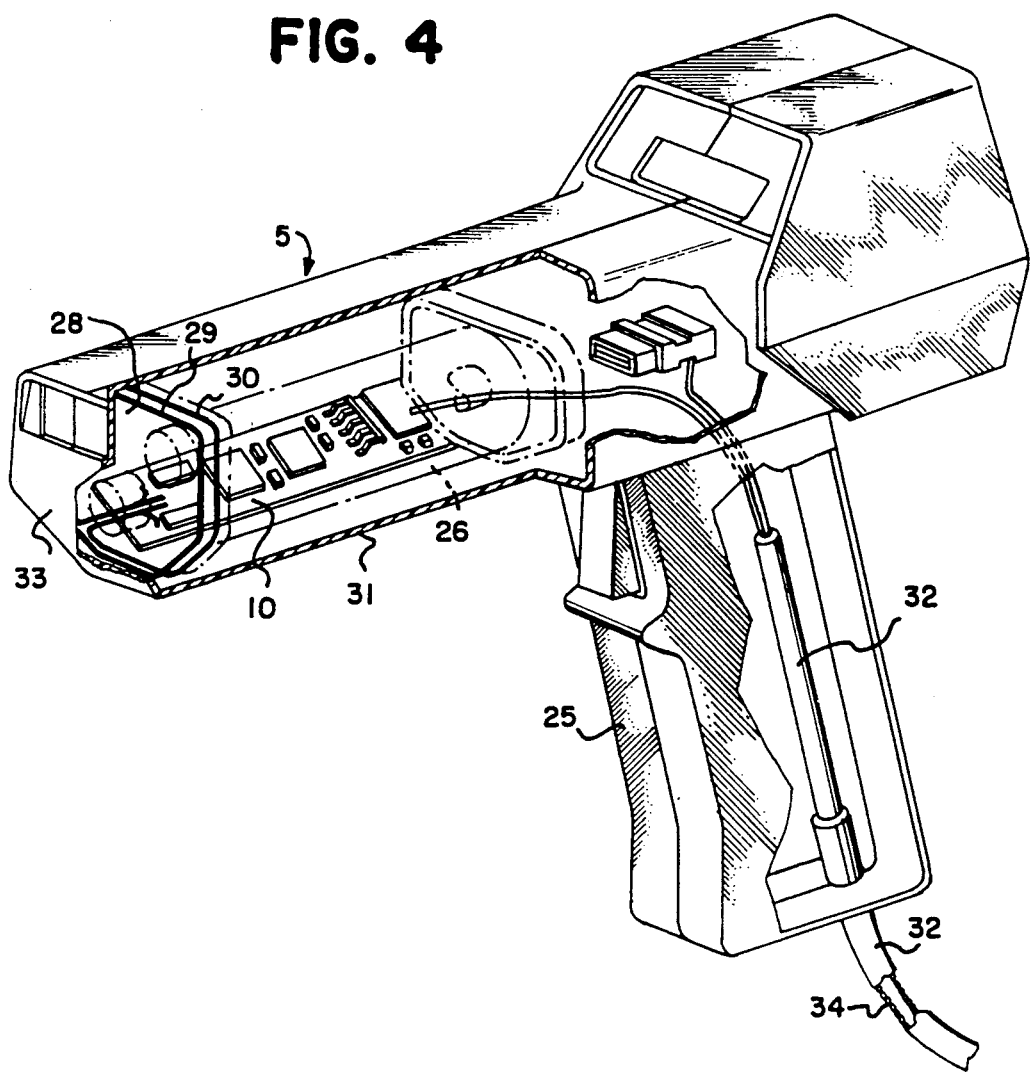
FIG. 4 is an isometric view of the gun of a hand held scanning device incorporating the deactivation system of the present invention, with portions broken away to show internal construction detail.
Figure 5:
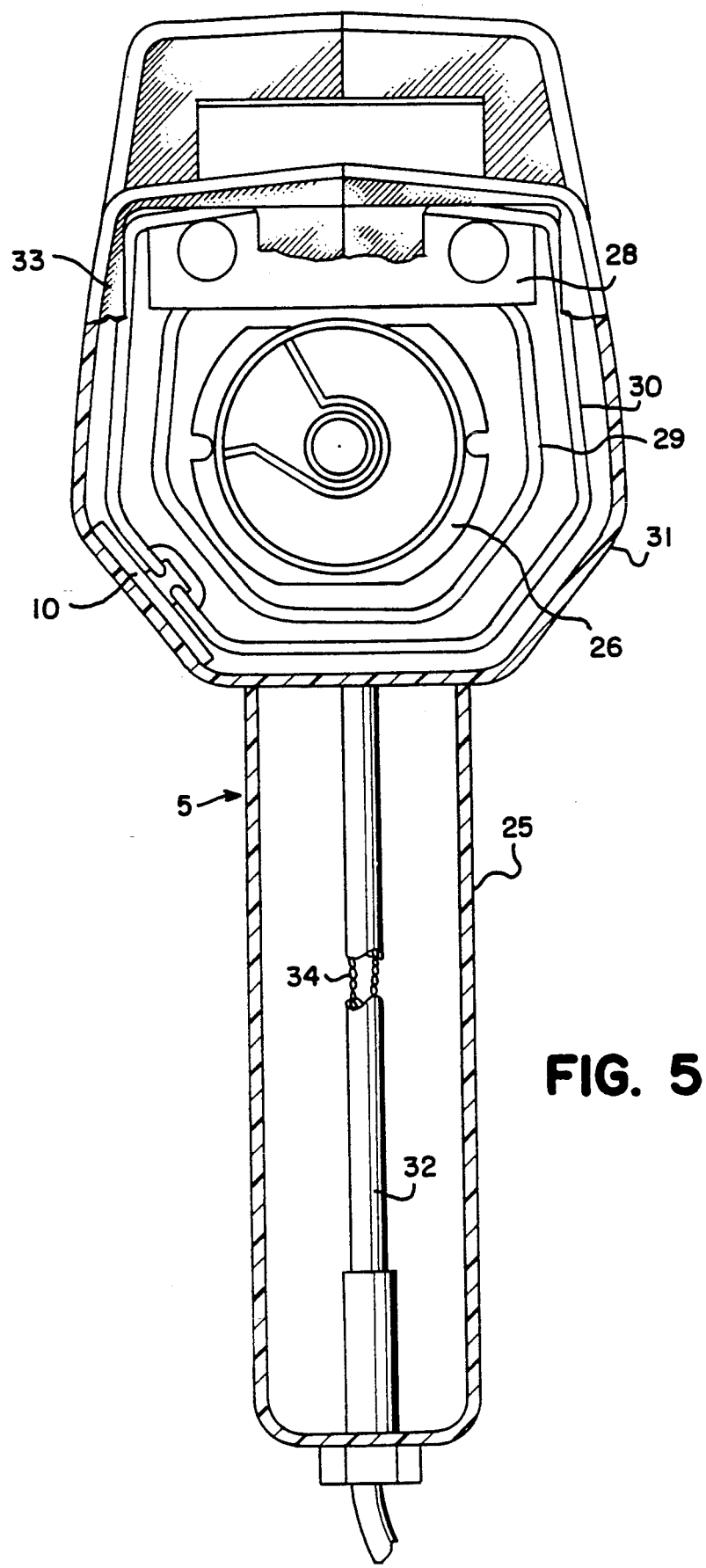
FIG. 5 is an end view of the gun of FIG. 4, broken away to show internal construction detail.

Another popular data capturing system is the so-called "hand-held" or "gun-type" system, of the type manufactured by Symbol Technologies, Inc. of Bohemia, N.Y. (Laserscan 7000 II). Referring now to FIGS. 4 and 5, the hand held system is provided with a gun 25 which makes use of a directed beam of light (developed by a laser 26) to read the bar code marking 4 which is provided on the surface 3 of the label 2, using known techniques.

As with the slot scanner 15, and in accordance with the present invention, the gun 25 of the hand held system is also fitted with a pair of single loop antennas 29, 30, which are in turn electrically coupled with a matching circuit 10 fitted within the housing 31 of the gun 25, as shown. In its preferred embodiment, the transmitting antenna 29 is formed as a single-turn loop positioned at the front end 33 of the housing 31, and the receiving antenna 30 is formed as a two-turn loop positioned closely behind the antenna 29. It has been found that this arrangement provides adequate isolation between the radio frequency signals of the deactivation system 1 and the radio frequency signals associated with the gun 25, without requiring the use of cancelling antenna configurations. This surprising result is believed to be attributable to the close spacing which is developed between the antennas 29, 30 fitted in the front end 33 of the gun 25 (and in the case of the slot scanner 15, to the effective sizing of its ground plane).

The matching circuit 10 communicates with the transceiver 12 of the control unit 13 (remotely located) using a modified cable 32 which accommodates the signals which must be transmitted between the matching circuit 10 and the transceiver 12 (for purposes of deactivation) in addition to the signals which must be transmitted between the gun 25 and the character decoder 6 of the hand held system (for purposes of reading bar code information). To this end, the wired connections extending between the matching circuit 10 and the transceiver 12 are configured as twisted leads 34 (to avoid radio interference) in a common (and shielded) cable together with the original wired connections extending between the gun 25 and the remainder of the hand held system (again using twisted leads to avoid radio interference).

Referring now to FIG. 6, the cable 32 communicates with a junction box 35 which receives, and separates the electrical connections extending between the matching circuit 10 of the antenna system 8 and the transceiver 12 of the control unit 13 from the electrical connections which are traditionally associated with the gun 25. Those electrical connections associated with the gun 25 are essentially passed through the junction box 35 and to the character decoder 6, as previously described. Those electrical connections associated with the deactivation system 1 are also passed through the junction box 35 and to the transceiver 12 of the control unit 13. However, the junction box 35 is additionally fitted with a beeper 36 which receives its operative signals from the control unit 13 in known manner.

In use, the gun 25 of the hand held system is brought into proximity with the bar code marking 4 on the surface 3 of the label 2 associated with a particular article 19, reading the provided marking 4 in conventional fashion. In the course of this scanning operation, care is taken to bring the forward end 33 of the gun 25 sufficiently close to the resonant circuit 9 associated with the label 2 to cause the resonant circuit 9 to encounter the electrical field which is produced by the transmitting antenna 29, and to interact with the antennas 29, 30 to provide an appropriate indication of the status of the label 2 as it is approached by the gun 25. Again, in connection with this procedure it is only necessary that the operator of the system 1 take care to draw the gun 25 sufficiently close to the label 2 to encounter these fields. This distance (e.g., 2 to 2.5 inches for deactivation) is again fully within the acceptable operating range of the gun 25, so that the data capturing function of the hand held system is in no way compromised. This then operates as previously described in connection with the slot scanner 15 to provide an audible signal which indicates that an operative label 2 has been encountered, and to verify the resulting deactivation procedure upon discontinuance of the audible signal which is then being produced by the beeper 36.

Accordingly, it is seen that in using either of the systems which have previously been described, both the acquisition of data from a bar code marking 4 and the deactivation of an associated label 2 is accomplished in a single procedure, essentially comprising little more than the procedures which were originally used only to acquire data from the bar code marking 4 (other than making sure that the label 2 encounters the fields produced by the antenna system 8). To be noted is that these results are accomplished without an increased utilization of counter space, and in a manner which is essentially transparent to the consumer (improving security). What is more, this is accomplished in a simple and straightforward manner, using a system which permits both the bar code reading function and the deactivation function to proceed without mutual radio interference. This is so despite the close proximity between the operative features of the data capturing system (the circuitry 40 of the slot scanner 15 and the laser 26/optical detector 27 of the gun 25) and the operative features of the deactivation system (the antennas 21, 22 and 29, 30 and the matching circuit 10), which had led persons of ordinary skill in the art to anticipate unacceptable interference between these two systems.

It will therefore be seen that such systems serve well to achieve the objectives which have previously been stated. It will also be understood that such systems are capable of variation without departing from the spirit and scope of the present invention.

For example, the previously described systems operate in conjunction with a slot scanner and a hand held scanner, which presently represent the scanning devices of greatest popularity. However, the deactivation system of the present invention is equally applicable to other data capturing systems, apart from these popular systems. For example, the system 1 of the present invention is equally useful in connection with other laser-based bar code reading systems, such as wand systems, laser diode systems, and the like. Further, such techniques are equally useful in connection with other types of bar code or even other character recognizing systems such as charge coupled devices (CCD) and radio frequency identification devices (RFID). Such techniques are also useful in connection with other types of deactivation systems including other radio frequency-based systems, as well as magnetic-based and microwave-based systems. Moreover, while described in the context of a point-of-sale transaction, it is to be understood that the deactivation system 1 of the present invention will also find applications in other fields involving optical scanning such as process controls, inventory controls, and library applications.

Yet another variation to consider is that more highly interactive combinations of the above-described deactivation systems and data capturing systems are also possible. For example, by electrically coupling the processor 7 of the data capturing system and the control unit 13 of the deactivation system (schematically shown at 45 in FIG. 1), it is possible to develop any of a number of interactive control sequences.

In this fashion it becomes possible to read a bar code, and to then determine if the product associated with that bar code is a protected (secured) product (as recognized in the data base of the processor 7), to enable deactivation of the label only after a valid and protected bar code has been read. This would make it virtually impossible for a shoplifter to surreptitiously deactivate the label, since in such case deactivation can only result from an entered transaction.

It further becomes possible to correlate an encountered label with the stock number of the article involved (i.e., its SKU number), to permit the processor 7 to accumulate relationships between protected items and stock code numbers. This would permit the retail establishment to verify that its protected items are being labeled by store personnel, creating an audit trail and alerting the store to potential training problems.

Yet another alternative would be to prevent a valid sale from being completed until both the data capturing and deactivation functions have been completed. This would make sure that both functions are completed before the article is given to the consumer. Other variations and sequences are clearly possible.

It will therefore be understood that various changes in the details, materials and arrangement of parts which have been herein described and illustrated in order to explain the nature of this invention may be made by those skilled in the art within the principle and scope of the invention as expressed in the following claims.

What is claimed is:

1. A method for operating a system having means for capturing data from label means associated with an article, wherein said article further includes means for actuating an electronic article surveillance means, said system further having integral means for deactivating said actuating means, said actuating means comprising means for disabling said actuating means in response to an applied radio-frequency field, and said method comprising the steps of capturing data from said label means using the capturing means of said system, and deactivating said actuating means using the deactivating means of said system, said deactivating further comprising positioning said actuating means within said applied radio-frequency field substantially simultaneously with said capturing.

2. The method of claim 1 wherein said capturing and said deactivating are performed in a single procedure.

3. The method of claim 1 wherein said actuating means forms part of said label means.

4. The method of claim 1 wherein said capturing means is a slot scanner having a region for performing said capturing, and said deactivating means is positioned in the vicinity of said region, and which further comprises moving said label means and said actuating means to said region, capturing said data and deactivating said actuating means.

5. The method of claim 1 wherein said capturing means is a hand held scanner and said deactivating means is positioned within portions of said hand held scanner, and which further comprises moving said hand held scanner to said label means and to said actuating means, capturing said data and deactivating said actuating means.

6. The method of claim 1 wherein said deactivating means includes means for detecting the presence of said actuating means and means for signaling a detected presence of said actuating means, and which comprises moving said deactivating means and said actuating means toward each other, activating said signaling means and deactivating said actuating means, thereby also deactivating said signaling means.

7. An apparatus including means for capturing data from label means associated with an article, wherein said article further includes means for actuating an electronic article surveillance means, said apparatus further including means for deactivating said actuating means,
said capturing means and said deactivating means comprising an integral unit,
said capturing means being a slot scanner having a window for accessing said label means, and
said deactivating means being positioned adjacent to said window and including a field generating antenna system which surrounds at least portions of said window.

8. The apparatus of claim 7 wherein said actuating means includes means for disabling said actuating means responsive to an applied field.

9. The apparatus of claim 8 wherein said actuating means forms part of said label means.

10. The apparatus of claim 8 wherein said actuating means is a resonant circuit comprising capacitive means formed of conductive plates separated by dielectric and said disabling means is a narrowing of the dielectric between respective portions of said capacitive means.

11. The apparatus of claim 8 wherein said label means incorporates a bar code marking, and said capturing means includes means for reading said bar code marking.

12. The apparatus of claim 7 wherein said deactivating means includes means for detecting the presence of said actuating means and means for signaling a detected presence of said actuating means.

13. The apparatus of claim 7 wherein said deactivating means is configured for incorporation into said data capturing means without creating radio interference with operation of said data capturing means or said deactivating means.

14. The apparatus of claim 7 wherein said capturing means has an operative distance range and said deactivating means has an operative distance range, and wherein the operative distance range of said deactivating means lies within the operative distance range of said capturing means.

15. An apparatus including means for capturing data from label means associated with an article, wherein said article further includes means for actuating an electronic article surveillance means, said apparatus further including means for deactivating said actuating means,
said capturing means and said deactivating means comprising an integral unit,
said capturing means being a hand held scanner having a gun for accessing said label means, and said deactivating means being positioned within forward portions of said gun and including a field generating antenna system,
said capturing means communicating with processor means and said deactivating means communicating with deactivating control means, and said apparatus further comprising means for separating signals received from said capturing means and said deactivating means for communication with said processor means and said deactivating control means.

16. The apparatus of claim 15 wherein said processor means is electrically connected with said deactivating control means.

17. An apparatus for deactivating a means for actuating an electronic article surveillance means when said actuating means is applied to an article which further includes label means accessible by means for capturing data from said label means, wherein said deactivating means is configured for incorporation into said data capturing means and to form an integral unit with said capturing means, said capturing means being a slot scanner having a window for accessing said label means, and said deactivating means being positioned adjacent to said window and including a field generating antenna system which surrounds at least portions of said window.

18. An apparatus for deactivating a means for actuating an electronic article surveillance means when said actuating means is applied to an article which further includes label means accessible by means for capturing data from said label means, wherein said deactivating means is configured for incorporation into said data capturing means and to form an integral unit with said capturing means,
said capturing means being a hand held scanner having a gun for accessing said label means, and said deactivating means being positioned within forward portions of said gun and including a field generating antenna system,
said deactivating apparatus further comprising means for separating signals received from said capturing means from signals received from said deactivating means.

19. An apparatus including means for capturing data from label means associated with an article, wherein said article further includes means for actuating an electronic article surveillance means,
said apparatus further including means for deactivating said actuating means,
said capturing means and said deactivating means comprising an integral unit,
said capturing means being a hand held scanner having a gun for accessing said label means, and said deactivating means being positioned within forward portions of said gun and including a radio-frequency field-generating antenna system.

20. The apparatus of claim 19 wherein said field-generating antenna system surrounds at least portions of said capturing means.

21. The apparatus of claim 19 wherein said deactivating means is configured for incorporation with said capturing means without creating radio interference with operation of said capturing means or said deactivating means.

22. The apparatus of claim 19 wherein said actuating means includes means for disabling said actuating means responsive to an applied field.

23. The apparatus of claim 19 wherein said actuating means forms part of said label means.

24. The apparatus of claim 19 wherein said actuating means is a resonant circuit comprising capacitive means formed of conductive plates separated by dielectric and said disabling means is a narrowing of the dielectric between respective portions of said capacitive means.

25. The apparatus of claim 22 wherein said label means incorporates a bar code marking, and said capturing means includes means for reading said bar code marking.

26. The apparatus of claim 19 wherein said deactivating means includes means for detecting the presence of said actuating means and means for signaling a detected presence of said actuating means.

27. The apparatus of claim 19 wherein said capturing means has an operative distance range and said deactivating means has an operative distance range, and wherein the operative distance range of said deactivating means lies within the operative distance range of said capturing means.

28. An apparatus including means for capturing data from label means associated with an article, wherein said article further includes means for actuating an electronic article surveillance means,
said apparatus further including means for deactivating said actuating means,
said capturing means and said deactivating means comprising an integral unit,
said capturing means being a hand held scanner having a gun for accessing said label means, and said deactivating means being a field generating antenna system positioned within forward portions of said gun.

29. The apparatus of claim 28 wherein said deactivating means includes a field generating antenna system.

* * * * *